(12) United States Patent
Horiguchi

(10) Patent No.: US 7,369,843 B2
(45) Date of Patent: May 6, 2008

(54) PORTABLE CELLULAR PHONE HAVING FUNCTION OF SEARCHING FOR OPERATIONAL FUNCTION AND METHOD FOR SEARCHING FOR OPERATIONAL FUNCTION IN PORTABLE CELLULAR PHONE

(75) Inventor: Masuyo Horiguchi, Saitama (JP)

(73) Assignee: NEC Corporation (JP)

( * ) Notice: Subject to any disclaimer, the term of this patent is extended or adjusted under 35 U.S.C. 154(b) by 528 days.

(21) Appl. No.: 10/864,700

(22) Filed: Jun. 9, 2004

(65) Prior Publication Data

US 2004/0253978 A1 Dec. 16, 2004

(30) Foreign Application Priority Data

Jun. 12, 2003 (JP) ............................. 2003-168350

(51) Int. Cl.
H04Q 7/22 (2006.01)
(52) U.S. Cl. ................ 455/414.1; 455/418; 455/550.1; 455/556.1; 455/556.2; 715/837; 715/838
(58) Field of Classification Search ................ 455/418, 455/566, 550.1–553.1, 414.1, 556.2, 556.1; 715/837, 838, 977; 707/3
See application file for complete search history.

(56) References Cited

U.S. PATENT DOCUMENTS

| | | | | |
|---|---|---|---|---|
| 5,710,844 | A | * | 1/1998 | Capps et al. ................. 382/317 |
| 6,198,939 | B1 | * | 3/2001 | Holmstrom et al. ......... 455/566 |
| 6,226,367 | B1 | * | 5/2001 | Smith et al. ............ 379/142.04 |
| 2002/0004408 | A1 | | 1/2002 | Masuda et al. ............. 455/550 |
| 2003/0060238 | A1 | | 3/2003 | McCarthy et al. .......... 455/566 |

FOREIGN PATENT DOCUMENTS

| | | |
|---|---|---|
| CN | 1285107 | 2/2001 |
| JP | 6-243018 | 9/1994 |
| JP | 06-332953 | 12/1994 |
| JP | 08-234956 | * 9/1996 |
| JP | 2000-276473 | 10/2000 |

OTHER PUBLICATIONS

Yoshitomo, "Complete Explanation of New Era High-End OS Full Attack", Windows 2000 Basic Operation, Windows Start, Feb. 29, 2002, vol. 5, No. 4, pp. 18-20.

* cited by examiner

Primary Examiner—Rafael Perez-Gutierrez
Assistant Examiner—Olumide Ajibade-Akonai
(74) Attorney, Agent, or Firm—Hayes Soloway P.C.

(57) ABSTRACT

A portable cellular phone having a search function to do a search for operational functions in which a focused search for a desired operational function by combining an icon search with a keyword search can be performed and the operational function for which the user wants to search can be easily and rapidly searched for through a simple operation.

9 Claims, 7 Drawing Sheets

FIG.2 search table (16)

| function name | | function-name reading kana information (17) | | icon information (18) | |
|---|---|---|---|---|---|
| alarm voice | = | アラームオン | = | □ (alarm icon) | classification 1-1 |
| personal identification number registration/change | = | アンショウバンゴウトウロクヘンコウ | = | ■ (personal identification number icon) | classification 2-2 |
| wake-up message | = | ウェイクアップメッセージ | = | ○ (wake-up icon) | classification 1-2 |
| liquid crystal concentration | = | エキショウノウドチョウセイ | = | ● (liquid-crystal icon) | classification 3-1 |
| response voice | = | オウトウオンセイ | = | ◎ (response icon) | classification 4-1 |
| · | = | · | = | · | |
| · | = | · | = | · | |
| · | = | · | = | · | |
| three party service | = | サンシャツウワサービス | = | @ (three party service icon) | classification 5-5 |
| intra-office number display | = | ジキョクバンゴウヒョウジ | = | ☆ (intra-office number icon) | classification 6-6 |
| time setting | = | ジコクノセッテイ | = | ★ (watch icon) | classification 1-3 |
| · | = | · | = | · | |
| · | = | · | = | · | |
| · | = | · | = | · | |
| stand-by screen setting | = | マチウケガメンセッテイ | = | ◇ (screen icon) | classification 3-2 |
| memory dial calling inhibit | = | メモリダイヤルヨビダシキンシ | = | ◆ (inhibit icon) | classification 7-3 |
| mail incoming voice | = | メールチャクシンオンセッテイ | = | △ (incoming voice icon) | classification 8-2 |

FIG.4
displayed example of menu screen
(first switching selected screen)
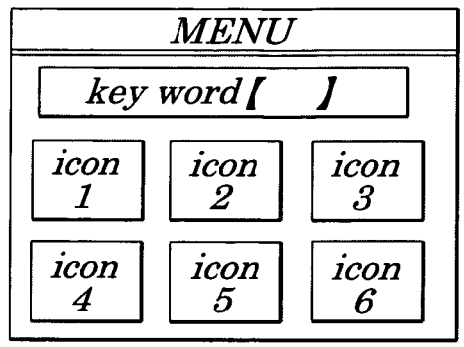
FIG.5
screen display for switching between icon search and focusing search 2
example of screen display
(when icon 6 in major classification is selected)
A screen
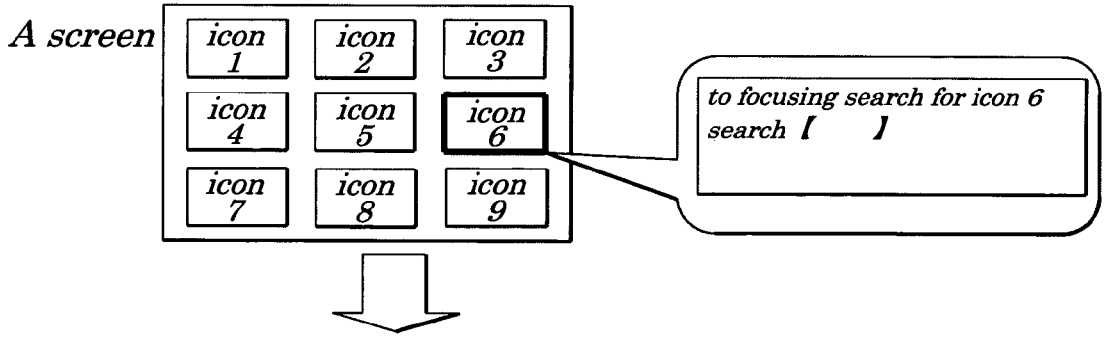
example of screen display
(when icon 6-6 in intermediate classification is selected)
B screen
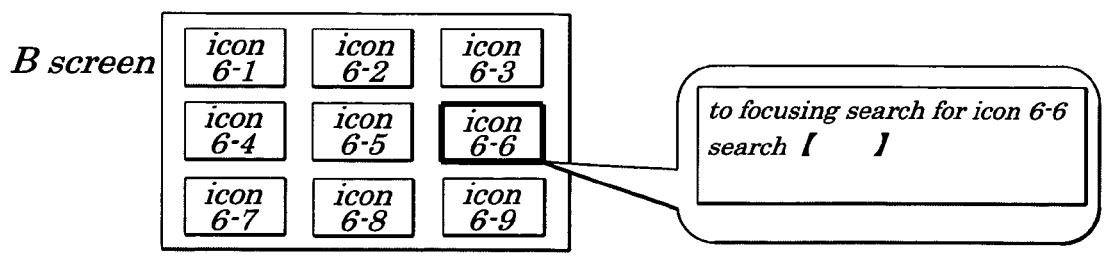

FIG.6
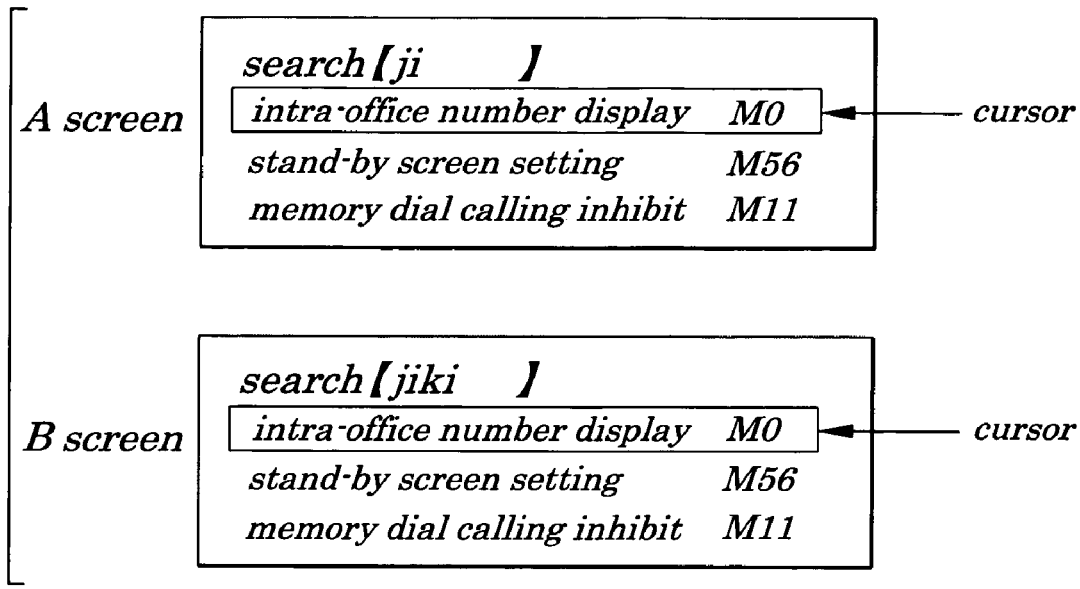
FIG.7
screen display for switching between icon search and focusing search 1
example of screen display
(when icon 6 in major classification is selected)
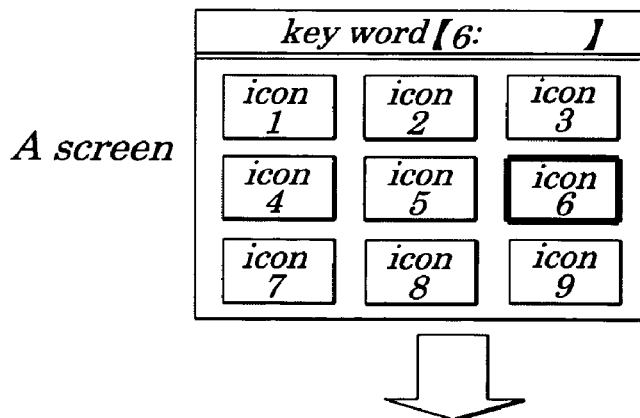
A screen
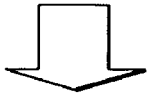
example of screen display
(when icon 6-6 in intermediate classification is selected)
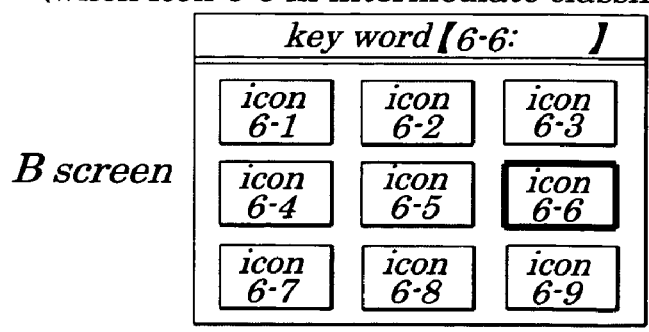
B screen

FIG.9 search table (16)

| function name | | function-name reading alphabet information (17) | | icon information (18) | |
|---|---|---|---|---|---|
| alarm voice | = | alarm voice | = | □ (alarm icon) | classification 1-1 |
| personal identification number registration/change | = | personal ID number registration/change | = | ■ (personal identification number icon) | classification 2-2 |
| wake-up message | = | wake-up message | = | ○ (wake-up icon) | classification 1-2 |
| liquid crystal concentration | = | liquid crystal concentration | = | ● (liquid-crystal icon) | classification 3-1 |
| response voice | = | response voice | = | ◎ (response icon) | classification 4-1 |
| · | | · | | · | · |
| · | | · | | · | · |
| · | | · | | · | · |
| three party service | = | three party service | = | @ (three party service icon) | classification 5-5 |
| intra-office number display | = | intra-office number display | = | ☆ (intra-office number icon) | classification 6-6 |
| time setting | = | time setting | = | ★ (watch icon) | classification 1-3 |
| · | | · | | · | · |
| · | | · | | · | · |
| · | | · | | · | · |
| stand-by screen setting | = | stand-by screen setting | = | ◇ (screen icon) | classification 3-2 |
| memory dial calling inhibit | = | memory dial calling inhibit | = | ◆ (inhibit icon) | classification 7-3 |
| mail incoming voice | = | mail incoming voice | = | △ (incoming voice icon) | classification 8-2 |

PORTABLE CELLULAR PHONE HAVING FUNCTION OF SEARCHING FOR OPERATIONAL FUNCTION AND METHOD FOR SEARCHING FOR OPERATIONAL FUNCTION IN PORTABLE CELLULAR PHONE

BACKGROUND OF THE INVENTION

1. Field of the Invention

The present invention relates to a portable cellular phone having a function of searching for an operational function and a method of searching for an operational function in the portable cellular phone and more particularly to the portable cellular phone having the function of searching for the operational function of performing a focusing search for a desired operational function by combining an icon search with a keyword search and the method for searching for the operational function in the portable cellular phone.

The present application claims priority of Japanese Patent Application No. 2003-168350 filed on Jun. 12, 2003, which is hereby incorporated by reference.

2. Description of the Related Art

In recent years, various operational functions of a portable cellular phone increase as it develops and the increase in the operational functions makes it difficult to perform an easy and rapid search for a desired operational function. In a conventional portable cellular phone, for example, a general method for searching for a desired operational function selected from two or more operational functions is known in which a numerical key assigned to a 10-button keypad is input by pressing a function invoking key (so-called "function invoking key+numerical key"). However, this search method requires memorizing of a function setting number (for example, F42 or a like), which causes a burdensome operation. To enter a function setting number, repeated pressing of a 10-button keypad many times is required, which takes time and also causes a bothersome operation. Therefore, an advent of a portable cellular phone being capable of performing an easy and rapid search for a desired operational function by a simple operation and of a searching method is expected.

A data display method and its system are disclosed, for example, in Japanese Patent Application Laid-open No. Hei 8-234956 (Third claim to eighth claim, FIGS. 1 to 14) in which data stored in database is searched for based on a key word to be displayed. In this data display method, an icon image and a related background image are stored in a manner in which each of them corresponds to a keyword and the icon image is displayed as an icon and, when data base is searched for with a desired keyword by operating this icon, the keyword is used to display data resulting from the search in which the background image is displayed as a background.

Moreover, a data filing device which is capable of improving operability for registration and searching operations regardless of whether an amount of data is large or small is disclosed in Japanese Patent Application Laid-open No. Hei 6-332953 (Page 4-8, FIG. 18). The data filing device has a symbol registration searching section that employs a method by which an icon is used and a keyword registration searching section that employs a method by which a keyword is input directly from a keyboard and uses properly either of the above searching sections based on a result from detection, which is performed by the document detecting section, of the number of files already registered and, when the number of files is small, the symbol registration searching section is used and, when the number of files are large, the keyword registration searching section is used.

However, the data search methods disclosed in the above Japanese Patent Application Laid-open Nos. Hei 8-234956 and Hei 6-332953 have a problem. That is, when a focusing search is to be performed using a keyword preset in a manner that corresponds to each of two or more operational functions, if the above methods are used, an easy and rapid search for a desired operational function by a simple operation is difficult. In the data display method disclosed in the Japanese Patent Application Laid-open No. Hei 8-234956, by operating a displayed icon, data stored in database is searched for by using a desired keyword and searched data resulting from the search is displayed using a background image as a background, however, no consideration is given to a focusing search to be done by using a keyword.

Moreover, in the data filing device disclosed in the Japanese Patent Application Laid-open No. Hei 6-332953, a symbol registration searching section that employs a method by which an icon is used and a keyword registration searching section that employs a method by which a keyword is input directly from a keyboard are provided and any one of searching sections is selected to be driven according to the number of files already registered, however, since the search is performed by the selected searching section, it is impossible to switch the searching section in course of search operations. Therefore, there is no way but continue searching by using the searching section first selected.

SUMMARY OF THE INVENTION

In view of the above, it is an object of the present invention to provide a portable cellular phone having a function of searching for an operational function being capable of, when a focusing search for a desired operational function by combing an icon search with a keyword search is performed, doing an easy and rapid search for a desired operational function by a simple operation and of a method for searching for an operational function in the above portable cellular phone.

According to a first aspect of the present invention, there is provided a portable cellular phone including a search function to perform a search for an operational function which is configured so as to store keywords each being preset in a manner that corresponds to each of two or more operational functions and to store icon information corresponding to each of the keywords and which is configured so as to do a focusing search for a desired operational function by combining a keyword search using the keywords and an icon search using the icon information;

the portable cellular phone having a search table to be used for search operations which stores, in specified order, the keywords each being preset in a manner that corresponds to each of two or more operational functions and icon information corresponding to each of the keywords, and a control section to do an icon search for the desired operational function and, whenever necessary, to switch the search operation from the icon search to the keyword search in course of the icon search and to input one head character of one of the keywords corresponding to the desired operational function for searching through the search table and, if the desired operational function is unable to be searched for, to additionally input a next character for repetition of the searching through the search table to search, in a focused manner, for the desired operational function for which a user wants to search for.

In the foregoing, a preferable mode is one, wherein the icon information hierarchically contains classification information about the desired operational function.

Also, a preferable mode is one, wherein the search table contains function-name reading letter information (for example, Kana letter information) and icon information about names of operational functions.

Also, a preferable mode is one wherein the function-name reading letter information (for example, Kana letter information) and the icon information are associated with each other and are stored, in specified order, by using the keywords being stored in the function-name reading letter information.

Furthermore, a preferable mode is one wherein a search using the search table is conducted by operations of an inputting section having a function invoking key, letter key (for example, Kana letter key), confirming key, and scrolling key, based on control by the control section.

According to a second aspect of the present invention, there is provided a function searching method employed in a portable cellular phone having a search function to search for an operational function which is configured so as to store keywords each being preset in a manner that corresponds to each of two or more operational functions and to store icon information corresponding to each of the keywords and which is configured so as to do a focusing search for a desired operational function by combining a keyword search using the keywords and an icon search using the icon information, the function searching method including;

a step of storing, in specified order, the keywords each being preset in a manner that corresponds to each of two or more operational functions and icon information corresponding to each of the keywords; and function and, whenever necessary, switching the searching operation from the icon search to the keyword search in course of the icon search and inputting one head character of one of the keywords corresponding to the desired operational function for searching through the search table and, if the desired operational function is unable to be searched for, additionally inputting a next character for repetition of the searching through the search table to search, in a focused manner, for the desired operational function for which a user wants to search for.

With the above configuration, the portable cellular phone of the present invention includes a function for searching for an operational function which has the search table to be used for searching operations which is adapted to store two or more keywords each being preset so as to correspond to each of two or more operational functions and icon information corresponding to the keyword and the control section to perform the icon search for an operational function and, whenever necessary, to switch the search operation from the icon search to the keyword search in course of the icon search and to input one head character of the keyword corresponding to a desired operational function for searching through the above search table and, if the targeted operational function can not be searched for, to additionally input a next character to repeat the search through the search table, in a focused manner, for the desired operational function for which a user wants to do the search.

With another configuration as above, the method for searching for an operational function in the portable cellular phone of the present invention has a step of storing two or more keywords each being pre-set so as to correspond to each of operational functions and icon information corresponding to the keyword and a step of performing the icon search for an operational function and, in course of the icon search and whenever necessary, switching the search method from the icon search to the keyword search and inputting one head character of the keyword corresponding to the operational function to do the search through the above search table and, if the targeted operational function can not be searched for, additionally inputting a next character to repeat the search through the search table for the focusing search for an operational function for which a user wants to do a search.

Therefore, when the focusing search for a desired operational function by combining the icon search with the keyword search is performed, an operational function for which a user wants to do a search can be easily and rapidly searched for by a simple operation.

BRIEF DESCRIPTION OF THE DRAWINGS

The above and other objects, advantages, and features of the present invention will be more apparent from the following description taken in conjunction with the accompanying drawings in which:

FIG. 2 is a diagram showing contents of a search table being stored in a memory serving as a main component of the portable cellular phone according to the embodiment of the present invention;

FIG. 4 is a diagram illustrating an example of a display screen appearing when the focusing search for a desired operational function is performed by using the portable cellular phone according to the embodiment of the present invention;

FIG. 5 is also a diagram illustrating an example of a display screen appearing when the focusing search for a desired operational function is performed by using the portable cellular phone according to the embodiment of the present invention;

FIG. 6 is also a diagram illustrating an example of a display screen appearing when the focusing search for a desired operational function is performed by using the portable cellular phone according to the embodiment of the present invention;

FIG. 7 is also a diagram illustrating an example of a display screen appearing when the focusing search for a desired operational function is performed by using the portable cellular phone according to the embodiment of the present invention;

FIG. 9 is a diagram showing contents of a search table being stored in a memory serving as a main component of the portable cellular phone according to a modified embodiment of the present invention.

DETAILED DESCRIPTION OF THE PREFERRED EMBODIMENTS

Best modes of carrying out the present invention will be described in further detail using various embodiments with reference to the accompanying drawings.

Embodiment

Figure 1:
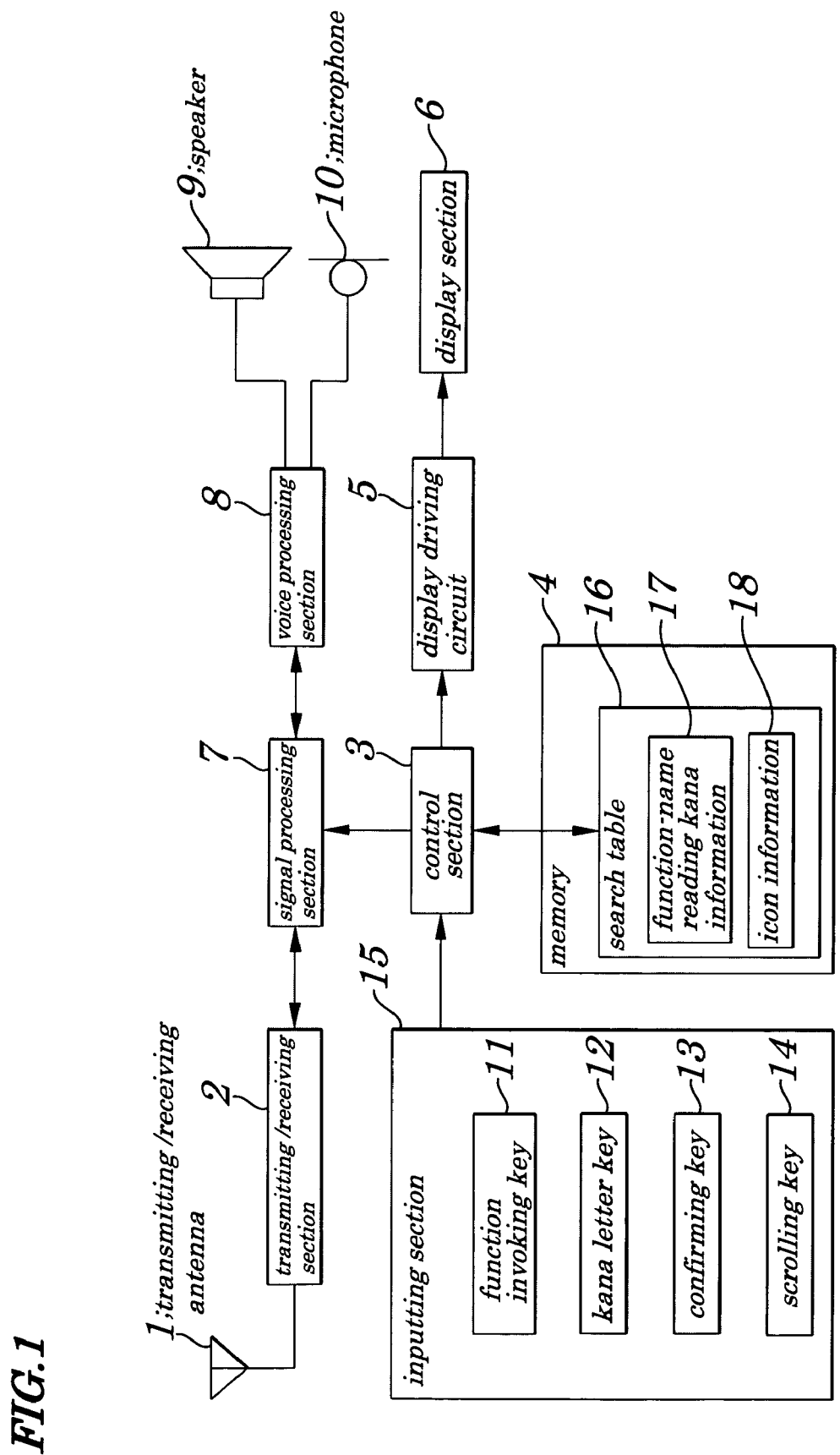
FIG. 1 is a schematic block diagram showing configurations of a portable cellular phone having a function of searching for an operational function according to an embodiment of the present invention.
Figure 3:
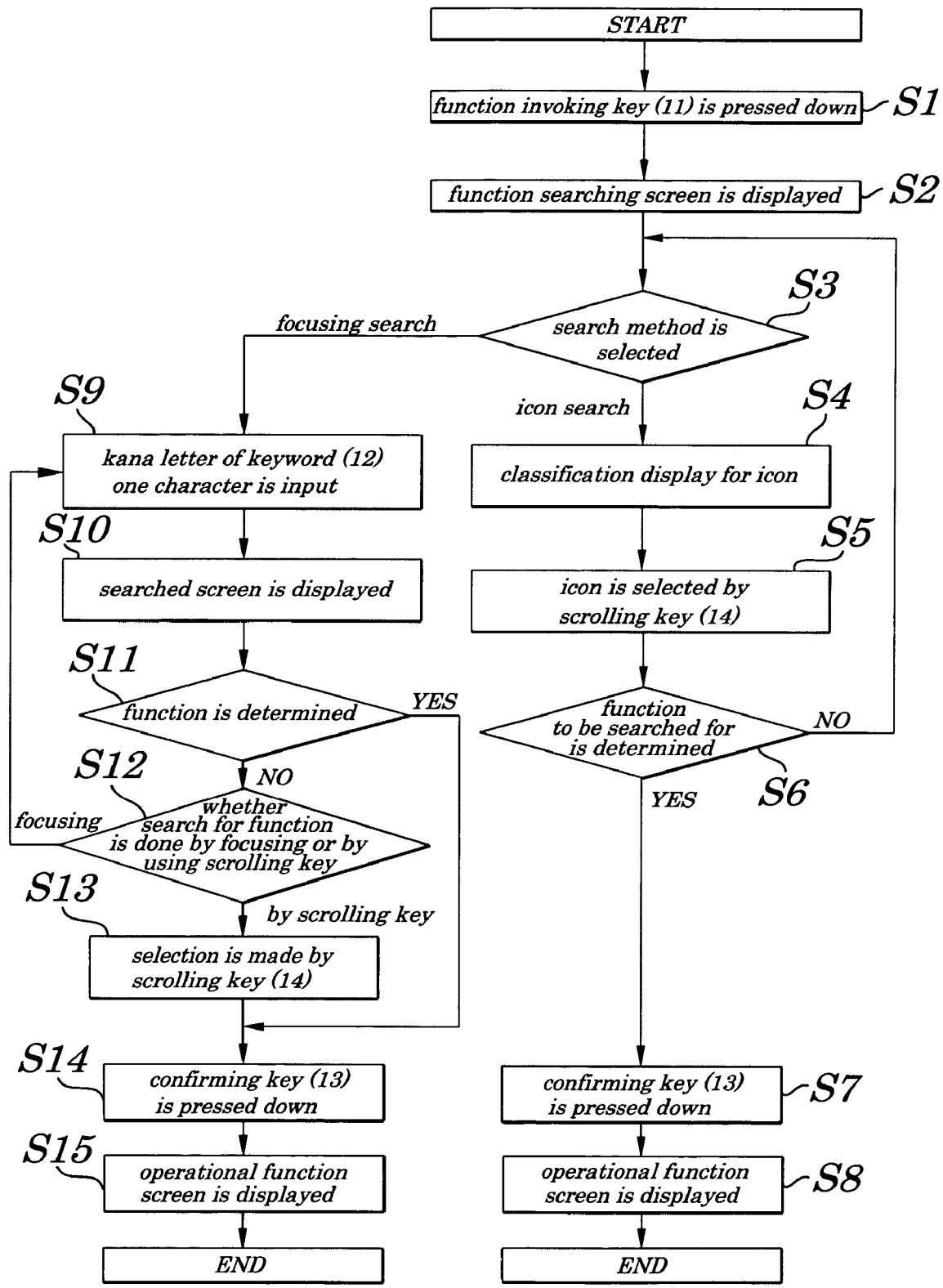
FIG. 3 is a flowchart explaining a method for performing a focusing search for a desired operational function by combining an icon search with a keyword search using the portable cellular phone according to the embodiment of the present invention.
Figure 8:
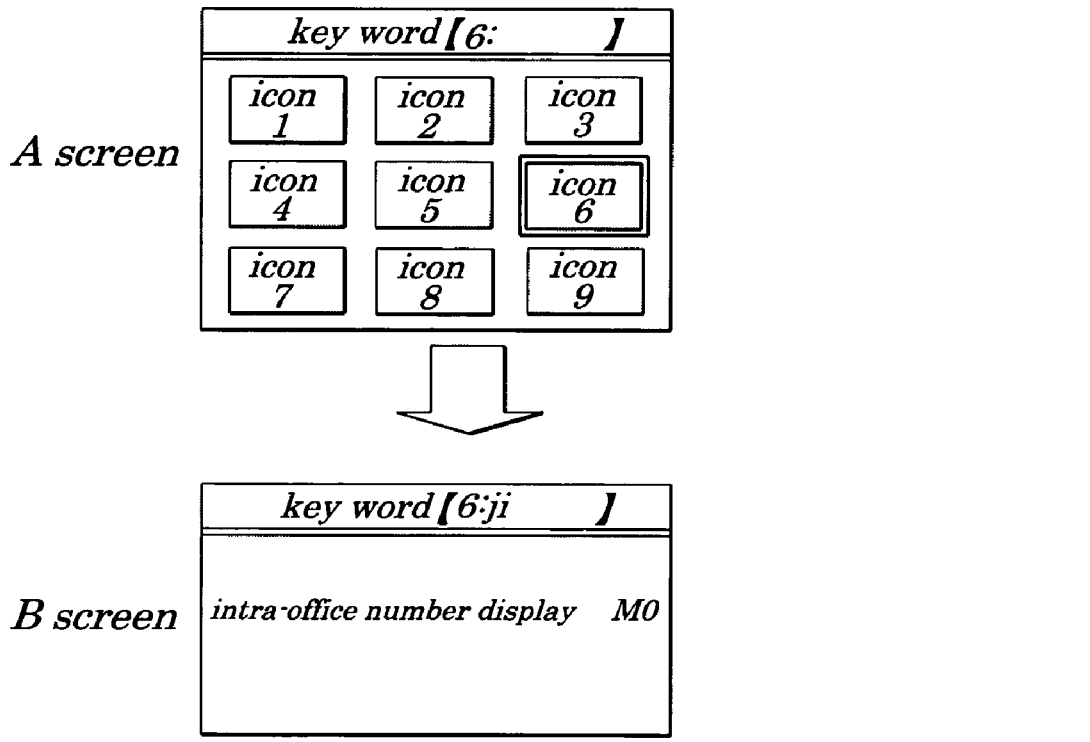
FIG. 8 is also a diagram illustrating an example of a display screen appearing when the focusing search for a desired operational function is performed by using the portable cellular phone according to the embodiment of the present invention.

FIG. 1 is a schematic block diagram showing configurations of a portable cellular phone having a means (function) of searching for an operational function according to an embodiment of the present invention. FIG. 2 is a diagram showing contents of a search table being stored in a memory serving as a main component of the portable cellular phone according to the embodiment. FIG. 3 is a flowchart explaining a method for performing a focusing search for a desired operational function by combining an icon search with a keyword search using the portable cellular phone according to the embodiment. FIGS. 4 to 8 are diagrams illustrating examples of display screens to be used when the focusing search for a desired operational function is performed by using the portable cellular phone according to the embodiment.

The portable cellular phone having the function of searching for the operational function according to the embodiment, as shown in FIG. 1, includes a transmitting/receiving antenna 1 to transmit and receive a signal to or from a base station, a transmitting/receiving section 2 being connected to the transmitting/receiving antenna 1 to perform modulation and demodulation of a transmitting or receiving signal, a signal processing section 7 being connected to the transmitting/receiving section 2 to process a voice signal and a data signal that are transmitted and received, a voice processing section 8 being connected to the signal processing section 7 to encode or decode the voice signal, a speaker 9 being connected to the voice processing section 8 to convert a decoded analog electric signal into a voice and to output the voice, and a microphone 10 being connected to the voice processing section 8 to convert an input voice into an analog electric signal and to output the produced analog electric signal.

Moreover, the portable cellular phone having the function of searching for the operational function of the embodiment, as shown in FIG. 1, includes a control section 3 being connected to the signal processing section 7 to process the data signal, a memory 4 being connected to the control section 3 to store a search table 16 (to be described later), an inputting section 15 being connected to the control section 3 which has a function invoking key 11, a kana letter key 12, a confirming key 13, and a scrolling key 14, a display driving circuit 5 being connected to the control section 3 to convert the data signal into an image information electrical signal, and a display section 6 being connected to the display driving circuit 5 to convert the image information electric signal into an image light and to display it.

The search table 16 being stored in the memory 4 described above includes function-name reading Kana letter information 17 and icon information 18 and, as shown in FIG. 2, each function-name reading Kana letter information 17 is associated with each icon information 18 and keywords contained in the function-name reading Kana letter information 17 are used as reference which are stored in the order of the kana syllabary. For, example, "Alarm voice" is represents as [アラームオン] in Kana letter. "Wake-up message" is represents as [ウェイクアップ メッセージ] in Kana letter. "Time setting" is represents as [ジコクノセッテイ] in Kana letter.

The icon information 18 hierarchically contains classification information about two or more operational functions. That is, the classification information about two or more operational functions is hierarchically contained in the form of a major classification, intermediate classification, and minor classification. FIG. 2 shows an example of the intermediate classification. Thus, the portable cellular phone of the embodiment is so configured that a focusing search for an icon can be conducted by having the icon information 18 hierarchically contain the classification information about two or more operational functions.

Moreover, the portable cellular phone of the embodiment is also configured so that, even in course of the icon search, whenever necessary, the search operation is switched, according to judgement of a user, from the icon search to the keyword search using a keyword being stored in the function-name reading Kana letter information 17 in the search table 16. Also, when the keyword search is done, if an operational function can not be searched for by inputting one head kana letter of a keyword corresponding to a desired operational function for searching for the operational function through the search table 16, the desired operational function is searched for, in a focused manner, by additionally inputting a next kana letter and by repeating the search through the search table 16.

Next, a method for performing a focusing search by combining the icon search with the keyword search, using the portable cellular phone of the embodiment is described. Here, one example is described in which a function of "intra-office number display" is selected, as a desired operational function, out of two or more operational functions being stored in the search table 16. First, the function invoking key 11 in the inputting section 15 is pressed down (Step S1). Next, the control section 3 detects that the function invoking key 11 has been pressed down and makes the display section 6 display a menu screen as shown in FIG. 4 through the display driving circuit 5 (Step S2). In the menu screen, a column for keyword inputting and icons (icon 1 to icon 6) are displayed, which appears as a first selected screen. Then, either of the icon search or the focusing search using keywords is selected (Step S3). The selection of the search method is determined depending on judgement of the user.

A cursor (not shown) is displayed in the menu screen shown in FIG. 4 and the cursor can move sequentially in the order of, for example, icon 6 ⇒ icon 5 ⇒ icon 4 ⇒ . . . ⇒ icon 1 ⇒ keyword. Therefore, by putting the cursor on any one of the icon 1 to the icon 6, the icon search can be selected. Also, by putting the cursor on a column of a keyword, the keyword search can be selected. Moreover, by assigning each of keys making up the 10-button key to each of the icon 1 to icon 6 and the column of the keyword by pressing each of the assigned keys, either of the icon search or keyword search can be selected.

Now let it be assumed that the icon 6 corresponding to the major classification 6 containing the function of the "intra-office number display" being a desired function here is pressed down to select the icon search (Step S3). This causes an "A" screen shown in FIG. 5 to be displayed (Step S4) and, thereafter, each time when the icon is selected by pressing the scrolling key 14 in the inputting section 15 (Step S5), a desired icon out of icons making up the "B" screen shown in FIG. 5 existing hierarchically below the icons making up the "A" screen shown in FIG. 5 is selected to perform a focusing search. Next, whether or not the "intra-office number display" being the desired operational function is displayed in a column for a search result is judged (Step S6). When the desired "intra-office number display" is displayed as the search result, the confirming key 13 in the inputting section 15 is operated to confirm that the function of the "intra-office number display" has been searched for (Step S7).

As a result, an operational function screen showing the "intra-office number display" searched for by the above operation is displayed on the display section 6 (Step S8), which means that the targeted operational function of the "intra-office number display" has been successfully searched for. If the targeted operational function of the "intra-office number display" is not searched for at Step S6, the routine returns to Step S3 to select either of the icon search or the focusing search using a keyword (Step S3). Moreover, after one icon has been selected, a menu being classified hierarchically below the icon is displayed in a form of a table within a so-called "balloon" on an explaining display screen.

Next, a search method to be employed when a focusing search using a keyword is selected in Step S3 is described. First, by operating the character key 12 in the inputting section 15, [ジ] pronounced as "ji" being one character in the keyword [ジキョクバンゴウヒョウジ], pronounced as "jikyokubangouhyouji" meaning "intra-office number display" is input (Step S9). Next, the control section 3 detects the inputted character and searches for a name of an operational function beginning with the character [ジ] pronounced as "ji" from the function-name reading Kana letter information 17 to display the searched screen on the display section 6 (Step S10). Then, whether or not the targeted keyword [ジキョクバンゴウヒョウジ], pronounced as "jikyokubangouhyouji" meaning "intra-office number display" is displayed as the result from the search is judged (Step S11). If, due to a small number of function names beginning with a word [ジ] pronounced as "ji", the targeted keyword [ジキョクバンゴウヒョウジ] pronounced as "jikyokubangouhyouji" meaning "intra-office number display" is searched for as a result from the search, "A" screen in FIG. 6 is displayed. The flow proceeds to Step S14.

However, unlike in the above examples, in actual searches, display of a targeted function by one time keyword search is very rare and, in almost all cases, a name of a function being different from a targeted function name is displayed. Therefore, if the targeted keyword [ジキョクバンゴウヒョウジ], pronounced as "jikyokubangouhyouji" is not displayed as a result from the search, whether the keyword [ジキョクバンゴウヒョウジ], pronounced as "jikyokubangouhyouji" is to be searched for by again using the scrolling key 14 or a focusing search is to be done is judged (Step S12). At this point, the number of searched results displayed in Step S10 serves as a guide for judgement. The judgement is made so that, if comparatively many function names beginning with, for example, the word [ジ] pronounced as "ji" are searched, since a search for the targeted keyword [ジキョクバンゴウヒョウジ] pronounced as "jikyokubangouhyouji" from the many function names by using the scrolling key 14 is difficult, a focusing search is done again.

Therefore, the routine is then made to again return to Step S9 and a [キ] pronounced as "ki" being one character next to the word [ジ] pronounced as "ji", in the keyword [ジキョクバンゴウヒョウジ], pronounced as "jikyokubangouhyouji" is additionally input. Next, the controlling section 3 detects its input and searches for a function name beginning with a word [ジキ] pronounced as "jiki" from the function-name reading Kana letter information 17 to have it displayed on the display section 6 (Step S10). Then, whether the targeted keyword [ジキョクバンゴウヒョウジ], pronounced as "jikyokubango uhyouji" is displayed as a result from the search is judged (Step S11). If, due to a small number of function names beginning with the word [ジキ] pronounced as "jiki", the targeted keyword [ジキョクバンゴウヒョウジ] pronounced as [ジキョクバンゴウヒョウジ], pronounced as "jikyokubangouhyouji" is searched for as a result from the search, "B" screen in FIG. 6 is displayed. The flow proceeds to Step S14.

Then, if the targeted keyword [ジキョクバンゴウヒョウジ] pronounced as [ジキョクバンゴウヒョウジ] pronounced as "jikyokubangouhyouji" is not searched for, whether the keyword [ジキョクバンゴウヒョウジ] pronounced as [ジキョクバンゴウヒョウジ] pronounced as "jikyokubangouhyouji" is to be searched for by again using the scrolling key 14 or a focusing search is to be done is judged (Step S12). When a comparatively small number of the function names is searched for, the search for the keyword [ジキョクバンゴウヒョウジ], pronounced as "jikyokubangouhyouji" from the small number of the function names is judged to be easy and then, the search using the scrolling key 14 is done and the "B" screen shown in FIG. 6 is made to be displayed.

Next, by operating the scrolling key 14 in the inputting section 15, the targeted keyword [ジキョクバンゴウヒョウジ], pronounced as "jikyokubangouhyouji" is selected (Step S13). The choice of the keyword [ジキョクバンゴウヒョウジ] pronounced as "jikyokubangouhyouji" is confirmed by pressing the confirming key 13 in the inputting section 15 (Step S14).

As a result, a screen showing the searched operational function of [ジキョクバンゴウヒョウジ], pronounced as "jikyokubangouhyouji" is displayed on the display section (Step S15) and the operational function of an "intra-office number display" invoked by the targeted keyword [ジキョクバンゴウヒョウジ], pronounced as "jikyokubangouhyouji" has been now searched for.

On the other hand, screen display may be made in a manner in which, after having made a menu screen be displayed in Step S2 and then an "A" screen in FIG. 7 be displayed, a "B" screen in FIG. 7 is displayed by selecting an icon 6-6 in intermediate classification. Then, after having made a numeral "6" be displayed in a column of the keyword and the "B" screen in FIG. 7 be displayed, by inputting a keyword [ジ] pronounced as "ji" by the way as described above, the targeted "intra-office number display" is searched for.

According to the above method in which the focusing search by combining the icon search with the keyword search is done, when a desired operational function is searched for, since, after having performed the icon search first, whenever necessary, switching to the keyword search in course of the search is made possible, the focusing search for a desired operational function can be performed easily. That is, for example, when the keyword [ジキョクバンゴウヒョウジ] pronounced as "jikyokubangouhyouji" is set which corresponds to the operational function of the "intra-office number display", a user first performs the icon search in classification containing the function of the "intra-office number display" and, if the user judges that, in course of the icon search, switching from the icon search to the focusing search using the keyword [ジキョクバンゴウヒョウジ], pronounced as "jikyokubangouhyouji" is better, the user does the focusing search by using the keyword [ジキョクバンゴウヒョウジ] pronounced as "jikyokubangouhyouji" and, therefore, the desired operational function can be easily searched for.

According to the portable cellular phone of the embodiment having a means for searching for an operational function by which the focusing search for a desired operational function is done by storing each of keywords being so pre-set as to correspond to any one of two or more operational functions and icon information corresponding to the keyword and by combining the keyword search using the above keyword with the icon search using the above icon information, the searching means has the search table 16 to be used for searching operations which is adapted to store two or more keywords containing, for example, a keyword [ジキョクバンゴウヒョウジ], pronounced as "jikyokubangouhyouji", being pre-set so as to correspond to the operational function of the "intra-office number display" and which is adapted to store icon information corresponding to the keyword and has the control section 3 to perform the icon search for an operational function of the "intra-office number display" and, whenever necessary, to switch the searching method to the keyword search using the keyword [ジ ジキョクバンゴウヒョウジ], pronounced as "jikyokubangouhyouji" in course of the icon search and to input one head kana letter [ジ] pronounced as "ji", being contained in the keyword [ジキョクバンゴウヒョウジ], pronounced as "jikyokubangouhyouji" corresponding to the operational function of the "intra-office number display" for searching through the above search table 16 and, if the targeted operational function can not be searched for, to additionally input a kana letter [キ] pronounced as "ki", next to the word [ジ] pronounced as "ji" to repeat the search through the search table 16, in a focused manner, for the desired operational function.

According to the method for searching for an operational function in the portable cellular phone of the embodiment, the method has a step of storing two or more keywords containing, for example, a keyword [ジキョクバンゴウヒョウジ] pronounced as "jikyokubangou hyouji" being pre-set so as to correspond to the operational function of the "intra-office number display" and storing icon information corresponding to the keyword and a step of performing the icon search for an operational function of the "intra-office number display" and, in course of the icon search and whenever necessary, switching the search method from the icon search to the keyword search using the keyword [ジキョクバンゴウヒョウジ], pronounced as "jikyokubangouhyouji" and inputting one head kana letter [ジ] pronounced as "ji", being contained in the keyword [ジキョクバンゴウヒョウジ], pronounced as "jikyokubangouhyouji" corresponding to the operational function of the "intra-office number display" to do the search through the above search table 16 and, if the targeted operational function can not be searched for, additionally inputting a kana letter [キ] pronounced as "ki", next to the word [ジ] pronounced as "ji" to repeat the search through the search table 16 for the focusing search for a desired operational function. Therefore, when the focusing search for a desired operational function by combining the icon search with the keyword search is performed, an operational function for which a user wants to do the search can be easily and rapidly searched for by a simple operation.

It is apparent that the present invention is not limited to the above embodiments but may be changed and modified without departing from the scope and spirit of the invention. For example, in the above embodiment, when the keyword focusing search is done, the focusing search is performed in two steps. However, the present invention is not limited to this. That is, the focusing search may be performed in three steps or more. In this case, by having the routine return to Step S9 in the embodiment and by additionally inputting a word [ヨ], pronounced as "yo", being one word next to [ジキ] pronounced as "jiki", being contained in the keyword [ジキョクバンゴウヒョウジ] pronounced as "jikyokubangouhyouji", such the focusing search as described may be repeated. Moreover, the switching from the icon search to the keyword search is not limited to the example shown in the flowchart in the embodiment, the switching may be performed, whenever necessary, at an arbitrary time depending on judgement of a user. Also, it is needless to say that, in the above embodiment, one example is shown in which the search for one function of the "intra-office number display" selected from two or more operational functions being stored in the search table in the portable cellular phone is done and the focusing search is performed by changing the keyword, however, other arbitrary functions may be searched for in the same manner as above according to the present invention. Also, in the above embodiment, the example is shown in which keywords in the kana letter each corresponding to each of operational functions are stored in the order of the kana syllabary, the order of arranging the keywords or operational functions, so long as they are arranged in specified order, is not limited to the order of the kana syllabary.

Furthermore, An official character or an official letter in the user own country, such as Alphabet and Kanji character may be used as function-name reading letter information, instead of function-name reading Kana letter information as above. For example, FIG. 9 is a diagram showing contents of a search table having function-name reading Alphabet letter information 17 according to a modified embodiment of the present invention.

What is claimed is:

1. A portable cellular phone having a search function to search for an operational function which is configured so as to store keywords, each keyword being preset in a manner that corresponds to each of two or more operational functions and to store icon information corresponding to each keyword, said search function also being configured to do a focusing search for a desired operational function by combining a keyword search using said keywords and an icon search using said icon information, said portable cellular phone comprising:

a search table for searching operations said search table storing, in specified order, said keywords, each keyword being preset in a manner that corresponds to each of two or more operational functions, and said icon information corresponding to each keyword, and a control section to do an icon search for said desired operational function and, whenever necessary, to switch the searching operation from said icon search to said keyword search while performing said icon search, said control section inputs one head character of one of said keywords corresponding to said desired operational function for searching through said search table and, if said desired operational function is unable to be searched for, said control section inputs an additional next character for repetition of said searching through said search table to search, in a focused manner, for said desired operational function.

2. The portable cellular phone having said search function to search for said operational function according to claim 1, wherein said icon information hierarchically contains classification information about said desired operational function.

3. The portable cellular phone having said search function to search for said operational function according to claim 1, wherein said search table contains function-name reading letter information and icon information about names of operational functions.

4. The portable cellular phone having said search function to search for said operational function according to claim 3, wherein said function-name reading letter information and said icon information are associated with each other and are stored, in specified order, by using said keywords being stored in said function-name reading letter information.

5. The portable cellular phone having said search function to search for said operational function according to claim 1, wherein the searching through said search table is conducted by operations of an inputting section having a function invoking key, letter key, confirming key, and scrolling key, based on control by said control section.

6. The portable cellular phone having said search function to search for said operational function according to claim 1, wherein said search table contains function-name reading Kana letter information and icon information about names of operational functions.

7. The portable cellular phone having said search function to search for said operational function according to claim 6, wherein said function-name reading Kana letter information and said icon information are associated with each other and are stored, in specified order, by using said keywords being stored in said function-name reading Kana letter information.

8. The portable cellular phone having said search function to search for said operational function according to claim 1, wherein the searching through said search table is conducted by operations of an inputting section having a function invoking key, kana letter key, confirming key, and scrolling key, based upon control by said control section.

9. A function searching method employed in a portable cellular phone having a search function to search for an operational function which is configured so as to store keywords, each keyword being preset in a manner that corresponds to each of two or more operational functions and to store icon information corresponding to each keyword, and said search function also being configured to do a focusing search for a desired operational function by combining a keyword search using said keywords and an icon search using said icon information, said function searching method comprising;

storing, in specified order, said keywords, each keyword being preset in a manner that corresponds to each of two or more operational functions, and icon information corresponding to each keyword; and performing an icon search for said desired operational function and, whenever necessary, switching the searching operation from said icon search to said keyword search, said control section inputs one head character of one of said keywords corresponding to said desired operational function for searching through said search table and, if said desired operational function is unable to be searched for, said control section inputs an additional next character for repetition of said searching through said search table to search, in a focused manner, for said desired operational function.

* * * * *